United States Patent
Kim

(10) Patent No.: US 7,358,774 B2
(45) Date of Patent: Apr. 15, 2008

(54) OUTPUT DRIVER CIRCUIT WITH PRE-EMPHASIS FUNCTION

(75) Inventor: Chan-Kyung Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 11/129,469

(22) Filed: May 13, 2005

(65) Prior Publication Data

US 2006/0071687 A1 Apr. 6, 2006

(30) Foreign Application Priority Data

Oct. 26, 2004 (KR) ...................... 10-2004-0085802

(51) Int. Cl.
*H03K 19/0175* (2006.01)

(52) U.S. Cl. .......................... 326/87; 326/86; 327/112; 327/108

(58) Field of Classification Search ................... 326/86, 326/83; 327/108, 112
See application file for complete search history.

(56) References Cited

U.S. PATENT DOCUMENTS

| 6,262,606 | B1 | 7/2001 | Tamjidi ...................... 327/108 |
|---|---|---|---|
| 6,393,062 | B1 | 5/2002 | Furman et al. .............. 375/252 |
| 6,518,792 | B2 * | 2/2003 | Jong et al. ..................... 326/87 |
| 6,704,365 | B2 | 3/2004 | Haycock ...................... 375/257 |
| 2002/0030517 | A1 * | 3/2002 | Kurisu et al. ................ 327/108 |
| 2004/0145394 | A1 * | 7/2004 | Nedachi ...................... 327/112 |
| 2005/0057280 | A1 * | 3/2005 | Groen et al. ................... 326/86 |
| 2006/0083079 | A1 * | 4/2006 | Hwang .................. 365/189.09 |

OTHER PUBLICATIONS

Korean Patent Application No. 1020000075574 to Cho et al, having Publication date of Jun. 20, 2002 (w/English Abstract page).

* cited by examiner

*Primary Examiner*—Vibol Tan
(74) *Attorney, Agent, or Firm*—Monica H. Choi

(57) ABSTRACT

In an output driver circuit and method, a control circuit generates a control signal in response to a current internal data signal. An output driver generates an output data signal in response to the control signal. A pre-emphasis circuit adjusts a current flowing through a node having the control signal generated thereon in response to a previous internal data signal. The pre-emphasis circuit may also adjust the output signal in response to the previous internal data signal.

18 Claims, 6 Drawing Sheets

OUTPUT DRIVER CIRCUIT WITH PRE-EMPHASIS FUNCTION

BACKGROUND OF THE INVENTION

This application claims priority to Korean Patent Application No. 2004-85802, filed on Oct. 2, 2004 in the Korean Intellectual Property Office, the disclosure of which is incorporated herein in its entirety by reference.

1. Field of the Invention

The present invention relates generally to output driver circuits, and more particularly, to an output driver circuit with a pre-emphasis function that adjusts a control signal to an output driver.

2. Description of the Related Art

In general, a high-speed input/output (I/O) circuit inputs or outputs data at a speed of several Gbps and uses a pre-emphasis technique to reject Inter Symbol Interference (ISI) jitter. The pre-emphasis technique prevents reduction in timing margin of transmitted data, caused by a change in data transition time according to the pattern of data.

FIG. 1 is a block diagram of a conventional output driver circuit 10. The output driver circuit 10 includes an output control circuit 11, an output driver 12, and a pre-emphasis circuit 13. The output control circuit 11 generates a control signal CTL in response to an internal data signal DQI(N). The output driver 12 generates an output data signal DQO in response to the control signal CTL.

In a transmission system that transmits data at a speed of several Gbps, a resistance-capacitance (RC) time constant is determined by parasitic capacitance and parasitic resistances at a transmission channel. The RC time constant determines the time required for the output data signal DQO to reach a high voltage level VOH or a low voltage level VOL.

The swing range of the output data signal DQO decreases when a next internal data signal is input to the output driver circuit 10 before the level of the output data signal DQO reaches the high voltage level VOH or the low voltage level VOL. The swing range is decreased more significantly when the pattern of the internal data signal DQI(N) is continuously toggled.

Referring to FIG. 2, when the internal data signal DQI(N) consecutively has the same value, e.g., when the logic values thereof are 1111, the output data signal DQO swings fully to the high voltage level VOH. In contrast, when the logic value of the internal data signal DQI(N) is continuously changed, e.g., when the logic values are 1010, the output data signal DQO does not swing fully to the high voltage level VOH or the low voltage level VOL.

To prevent this problem, the pre-emphasis circuit 13 controls the level of the output data signal DQO such that the swing range of the output data signal DQO is overall equalized regardless of the pattern of the internal data signal DQI(N). The output driver 12 has a high-current driving capability to drive a transmission channel. The pre-emphasis circuit 13 must also have a high-current driving capability to control the level of the output data signal DQO. Accordingly, use of the conventional output driver circuit 10 consumes a large amount of current and increases the pre-emphasis ratio, thereby lowering the efficiency.

SUMMARY OF THE INVENTION

Accordingly, the present invention provides an output driver circuit with a pre-emphasis circuit that adjusts a control signal to an output driver, thereby reducing current consumption and the pre-emphasis ratio.

In an output driver circuit and method according to an aspect of the present invention, a control circuit generates a control signal in response to a current internal data signal. In addition, an output driver generates an output data signal in response to the control signal. Furthermore, a pre-emphasis circuit adjusts a current flowing through a node having the control signal generated thereon in response to a previous internal data signal.

In one embodiment of the present invention, the adjustment of the current increases the control signal by a predetermined voltage increment when logic levels of the current and previous internal data signals are different and when the control signal has a logic high level. Alternatively, the adjustment of the current decreases the control signal by the predetermined voltage increment when logic levels of the current and previous internal data signals are different and when the control signal has a logic low level.

In addition, the adjustment of the current decreases the control signal by the predetermined voltage increment when logic levels of the current and previous internal data signals are same and when the control signal has a logic high level. Alternatively, the adjustment of the current increases the control signal by the predetermined voltage increment when logic levels of the current and previous internal data signals are same and when the control signal has a logic low level.

In a further embodiment of the present invention, the control circuit includes a multiplexer that serializes data bits of the current internal data signal according to a clock signal. In addition, the control circuit includes a pre-driver that generates the control signal in response to the serialized data bits of the current internal data signal. In an example embodiment of the present invention, the pre-driver generates the control signal as differential signals.

In another embodiment of the present invention, the pre-emphasis circuit includes a multiplexer that serializes data bits of the previous internal data signal according to a clock signal. The pre-emphasis circuit also includes a pre-driver that adjusts the current through the node having the control signal generated thereon in response to the serialized data bits of the previous internal data signal.

In a further embodiment of the present invention, the pre-emphasis circuit also adjusts an output current flowing through an output node having the output signal generated thereon in response to the previous internal data signal. In that case, the pre-emphasis circuit includes a multiplexer that serializes data bits of the previous internal data signal according to a clock signal. In addition, the pre-emphasis circuit includes a pre-driver that adjusts the current through the node having the control signal generated thereon in response to the serialized data bits of the previous internal data signal. Furthermore, another pre-driver generates another control signal in response to the serialized data bits of the previous internal data signal, and a sub-output driver adjusts the output current in response to the another control signal from the another pre-driver.

In another embodiment of the present invention, the pre-emphasis circuit further includes a sub-emphasis circuit that adjusts a control current through a control node having the another control signal generated thereon in response to another previous internal data signal. In that case, the sub-emphasis circuit includes another multiplexer that serializes data bits of the another previous internal data signal according to another clock signal. Also, an additional pre-driver adjusts the control current through the control node in response to the serialized data bits of the another previous internal data signal.

In this manner, the control signal to the output driver for driving the signal line with the output signal is adjusted by the pre-emphasis circuit. Thus, a high current for directly driving the signal line with the output signal is not required in the pre-emphasis circuit.

BRIEF DESCRIPTION OF THE DRAWINGS

The above and other features and advantages of the present invention will become more apparent when described in detailed exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7A, 7B, and 8 refer to elements having similar structure and/or function.

DETAILED DESCRIPTION OF THE INVENTION

Figure 3:
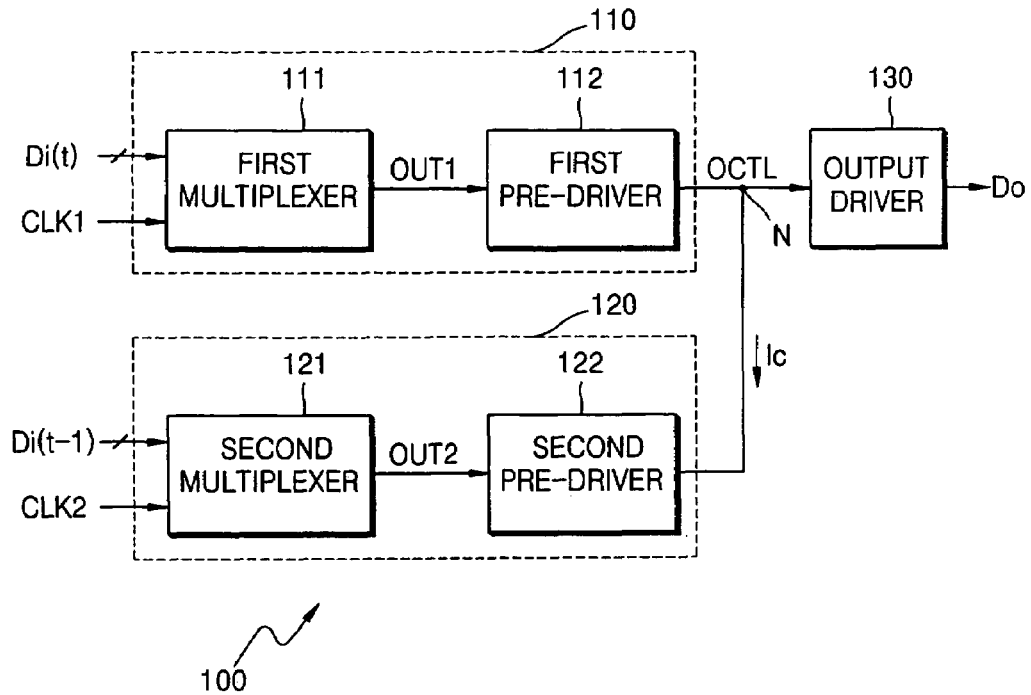
FIG. 3 is a block diagram of an output driver circuit according to an embodiment of the present invention.

FIG. 3 is a block diagram of an output driver circuit 100 according to an embodiment of the present invention. The output driver circuit 100 includes a control circuit 110, a pre-emphasis circuit 120, and an output driver 130. The control circuit 110 includes a first multiplexer 111 and a first pre-driver 112.

The first multiplexer 111 receives a plurality of bits (not shown) of a current internal data signal Di(t) to select and output each of such bits of the current internal data signal Di(t) in series as a first output signal OUT1, in response to a first clock signal CLK1. The first pre-driver 112 generates a control signal OCTL on an output node N in response to the first output signal OUT1. Specifically, the control signal OCTL output from the first pre-driver 112 goes high when the first output signal OUT1 is at a logic level of 1, and goes low when the first output signal OUT1 is at a logic level of 0. An output data signal Do generated by the output driver 130 in response to the control signal OCTL goes high or low. A signal line is driven by the output driver 130 with the output data signal Do.

The pre-emphasis circuit 120 includes a second multiplexer 121 and a second pre-driver 122. The second multiplexer 121 receives a plurality of bits (not shown) of a previous internal data signal Di(t−1) to select and output each of such bits of the previous internal data signal Di(t−1) in series as a second output signal OUT2, in response to a second clock signal CLK2.

The second pre-driver 122 adjusts a current Ic flowing from the output node N to control the voltage of the control signal OCTL generated at the node N, in response to the second output signal OUT2. In particular, when the output signal OUT2 is at a logic level of 1, the second pre-driver 122 decreases the current Ic to increase the voltage of the control signal OCTL by a predetermined voltage increment $\Delta V$ (see FIG. 4). Alternatively when the second output signal OUT2 is at a logic level of 0, the second pre-driver 122 increases the current Ic to reduce the voltage of the control signal OCTL by the predetermined voltage increment $\Delta V$.

In an alternative embodiment of the present invention, the first and second pre-drivers 112 and 122 are each a differential amplifier. The constructions and operations of the differential amplifiers individually are considered obvious to those ordinarily skilled in the art, and thus, a detailed description thereof will be omitted. If the first and second pre-drivers 112 and 122 are differential amplifiers, the first pre-driver 112 outputs differential signals OCTL' and OCTLB' (not shown) to first and second output nodes (not shown), respectively.

Further in that case, the second pre-driver 122 adjusts currents Ic' and Icb' from such first and second output nodes, respectively. The voltage of the control signal OCTL input to the output driver 130 is a difference of the voltages of the differential signals OCTL' and OCTLB". By adjusting the differential currents Ic' and Icb', the second pre-driver controls the voltage of the control signal OCTL to be increased or decreased by the predetermined voltage increment $\Delta V$.

Figure 4:
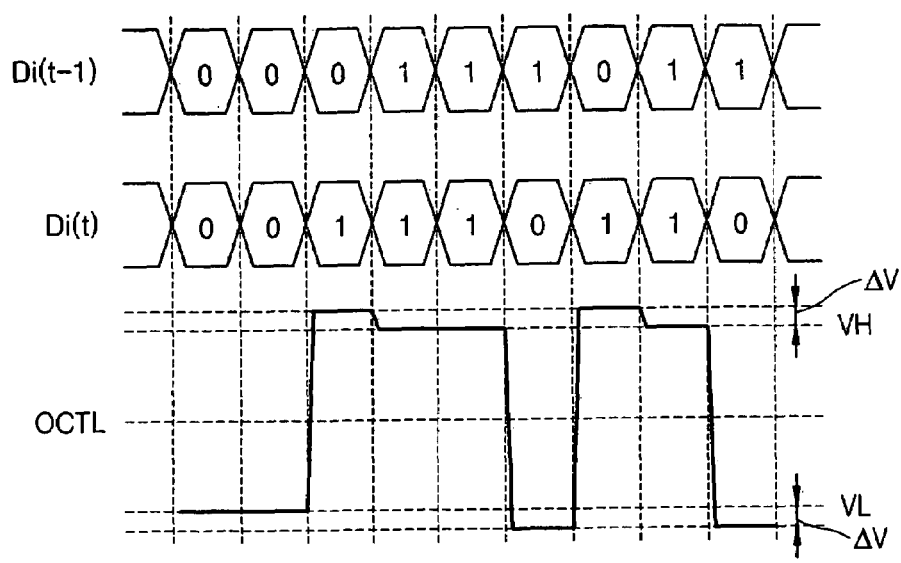
FIG. 4 is a timing diagram of internal data signals and a control signal during operation of the output driver circuit of FIG. 3, according to an embodiment of the present invention.

In any case, FIG. 4 is a timing diagram of the internal data signals Di(t) and Di(t−1) (that have been serialized) and the control signal OCTL, during operation of the output driver 130 of FIG. 3. In the example of FIG. 4, Di(t−1) data signal is the Di(t) data signal delayed by one clock cycle. Additionally in the example of FIG. 4, the internal data signals Di(t) and Di(t−1) are serialized with the first and second clock signals CLK1 and CLK2 that are a same clock signal.

Referring to FIG. 4, when both the current and previous internal data signals Di(t) and Di(t−1) are at a logic level of 1, the voltage of the control signal OCTL is VH. When both the current and previous internal data signals Di(t) and Di(t−1) are at a logic level of 0, the voltage of the control signal OCTL is VL.

Alternatively, when the previous internal data signal Di(t−1) is at the logic level of 0 and the current internal data signal Di(t) is at the logic level of 1, the voltage of the control signal OCTL is VH+$\Delta V$. When the previous internal data signal Di(t−1) is at the logic level of 1 and the current internal data signal Di(t) is at the logic level of 0, the voltage of the control signal OCTL is VL−$\Delta V$. Thus, the signal swing of the control signal OCTL is increased which in turn increases the signal swing of the output data signal Do.

Figure 5:
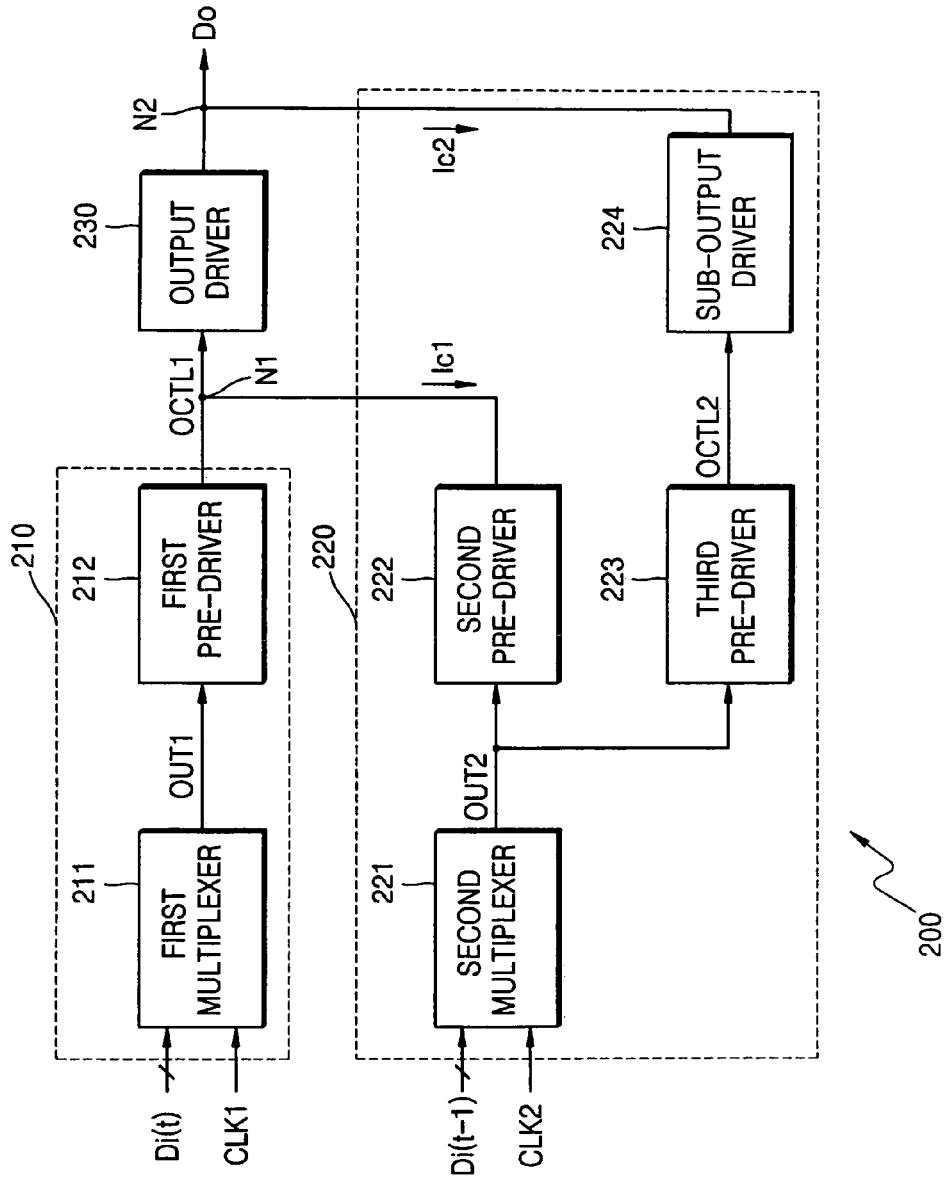
FIG. 5 is a block diagram of an output driver circuit according to another embodiment of the present invention.

FIG. 5 is a block diagram of an output driver circuit 200 according to another embodiment of the present invention. The output driver circuit 200 includes a control circuit 210, a pre-emphasis circuit 220, and an output driver 230. The control circuit 210 generates a first control signal OCTL1 on a first output node N1 in response to a current internal data signal Di(t). The construction and operation of the control circuit 210 and the output driver 230 are similar to those of the control circuit 110 and the output driver 130 of FIG. 3, respectively. Therefore, a detailed description of the construction and operation of the control circuit 210 and the output driver 230 in FIG. 5 will be omitted.

The pre-emphasis circuit 220 includes a second multiplexer 221, a second pre-driver 222, a third pre-driver 223, and a sub-output driver 224. The operations of the second multiplexer 221 and the second pre-driver 222 are similar to those of the second multiplexer 121 and the second pre-driver 122 of FIG. 3, respectively. Therefore, a detailed description of the construction and operation of the second multiplexer 221 and the second pre-driver 222 in FIG. 5 will be omitted.

The third pre-driver 223 outputs a sub-control signal OCTL2 in response to the second output signal OUT2 output from the second multiplexer 221. More specifically, the sub-control signal OCTL2 output from the third pre-driver 223 is at a high logic level when the second output signal OUT2 is at a logic level of 1, and is at a logic low level when the second output signal OUT2 is at a logic level of 0. The sub-output driver 224 controls the voltage of the output data signal Do generated on an output node N2 in response to the sub-control signal OCTL2.

More specifically, when the sub-control signal OCTL2 is at the logic level of 1, the sub-output driver 224 decreases a current Ic2 flowing from the output node N2 to increase the voltage of the output data signal Do by a predetermined voltage increment. Alternatively, when the sub-control signal OCTL2 is at the logic level of 0, the sub-output driver 224 increases the current Ic2 to reduce the voltage of the output data signal Do by the predetermined voltage increment.

In this manner, the voltage of the control signal OCTL1 and the voltage of the output data signal Do are controlled according to the logic levels of the current internal data signal Di(t) and the previous internal data signal Di(t−1). Since the second pre-driver 222 controls the voltage of the control signal OCTL1, it is possible to reduce the voltage of the output data signal Do controlled by the sub-output driver 224, and thus to reduce the amount of current required by the pre-emphasis circuit 220 and the pre-emphasis ratio. Further, the first through third pre-drivers 210, 222, and 223, the output driver 230, and the sub-output driver 224 may be implemented as differential amplifiers in another embodiment of the present invention.

Figure 6:
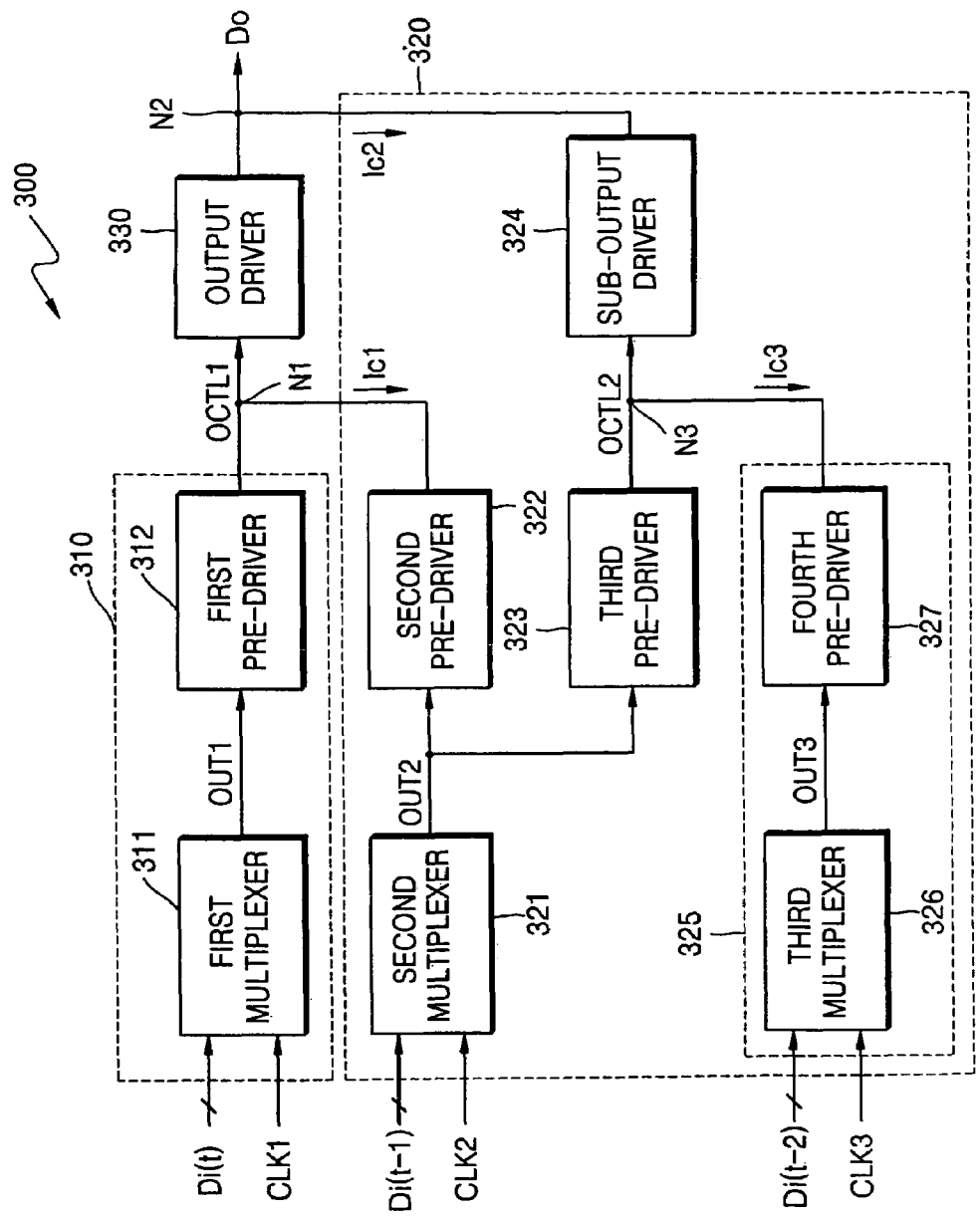
FIG. 6 is a block diagram of an output driver circuit according to yet another embodiment of the present invention.

FIG. 6 is a block diagram of an output driver circuit 300 according to yet another embodiment of the present invention. The output driver circuit 300 includes a control circuit 310, a pre-emphasis circuit 320, and an output driver 330. The control circuit 310 generates a control signal OCTL1 on an output node N1 in response to a current internal data signal Di(t). The construction and operation of the control circuit 310 and the output driver 330 are similar to those of the control circuit 110 and the output driver 130 of FIG. 3, respectively. Therefore, their detailed descriptions will be omitted.

The pre-emphasis circuit 320 includes a second multiplexer 321, a second pre-driver 322, a third pre-driver 323, a sub-output driver 324, and a sub-emphasis circuit 325. The construction and operation of the pre-emphasis circuit 320 are similar to those of the pre-emphasis circuit 220 of FIG. 5 except for the sub-emphasis circuit 325. Therefore, a detailed description of the construction and operation of the second multiplexer 321, the second pre-driver 322, the third pre-driver 323, and the sub-output driver 324 in FIG. 6 will be omitted.

The sub-emphasis circuit 325 includes a third multiplexer 326 and a fourth pre-driver 327. The third multiplexer 326 receives a plurality of bits (not shown) of another previous internal data signal Di(t−2) to select and output each of the bits of the internal data signal Di(t−2) in series as an output signal OUT3 in response to a third clock signal CLK3. The another previous internal data signal Di(t−2) may be further delayed from the previous internal data signal Di(t−1) that is input to the second multiplexer 321.

The fourth pre-driver 327 controls the voltage of a sub-control signal OCTL2 generated from the third pre-driver 323 on an output node N3 in response to the output signal OUT3. More specifically, when the output signal OUT3 is at a logic level of 1, the fourth pre-driver 327 increases the voltage of the sub-control signal OCTL2 by a predetermined voltage increment by decreasing a current Ic3 flowing from the output node N3. When the output signal OUT3 is at a logic level of 0, the fourth pre-driver 327 reduces the voltage of the sub-control signal OCTL2 by the predetermined voltage increment by increasing the current Ic3.

The first through fourth pre-drivers 312, 322, 323, and 327, the output driver 330, and the sub-output driver 324 may be differential amplifiers in an alternative embodiment of the present invention. As previously mentioned, since the fourth pre-driver 327 controls the voltage of the sub-control signal OCTL2, it is possible to significantly reduce the voltage of the output data signal Do controlled by the sub-output driver 324 to further reduce the amount of current required by the pre-emphasis circuit 320 and the pre-emphasis ratio.

Figure 1:
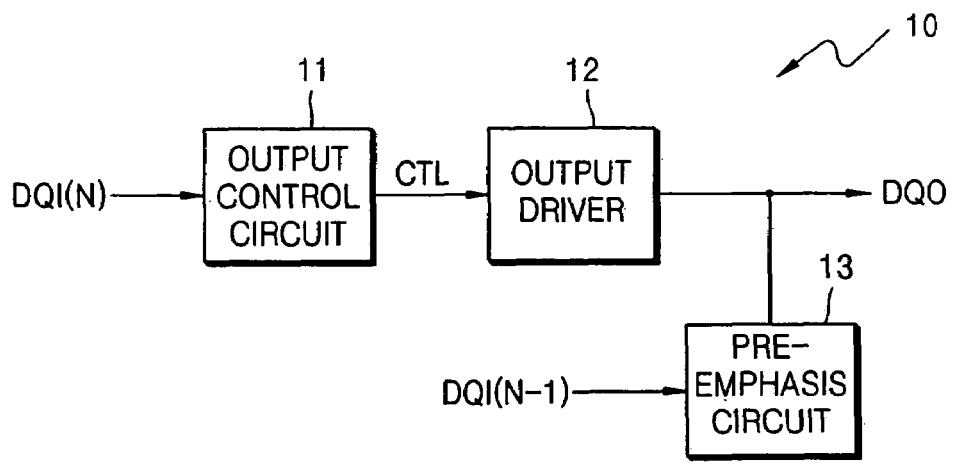
FIG. 1 is a block diagram of a conventional output driver circuit.
Figure 2:
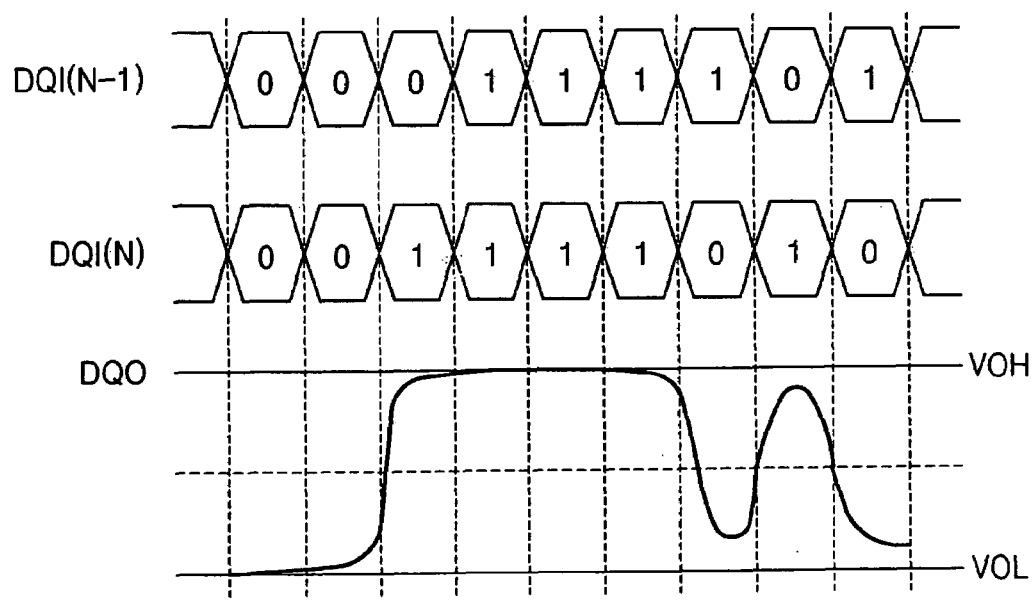
FIG. 2 is a timing diagram of internal data signals input to and an output data signal output from the output driver circuit of FIG. 1.
Figure 7A:
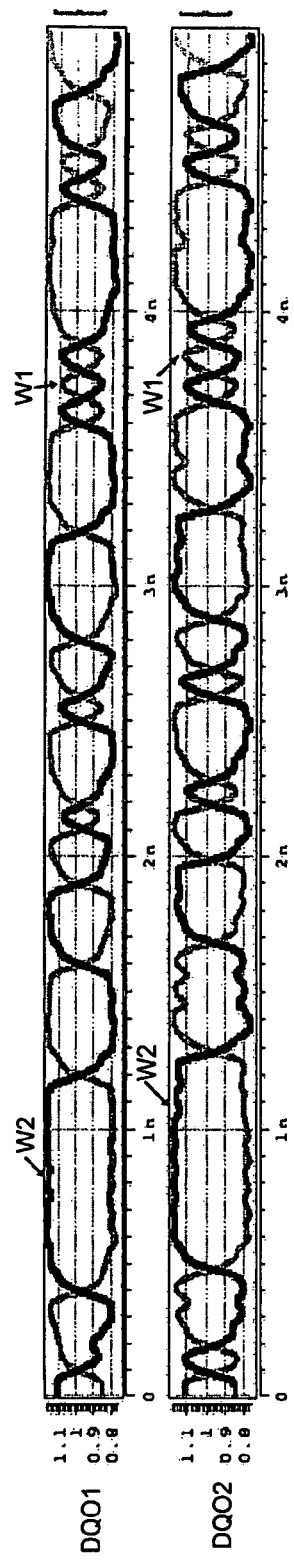
FIG. 7A is a waveform diagram of an output data signal output from a conventional output driver circuit.
Figure 7B:
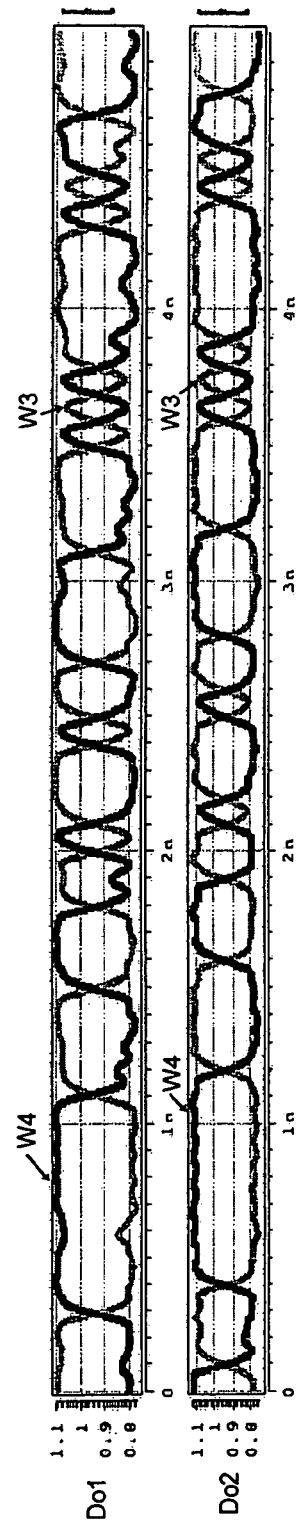
FIG. 7B is a waveform diagram of an output data signal output from an output driver circuit according to an embodiment of the present invention.

FIG. 7A is a waveform diagram of an output data signal output from the conventional output driver circuit 10 of FIG. 1. FIG. 7B is a waveform diagram of an output data signal output from the output driver circuit 100, 200, or 300 according to the present invention. Referring to FIG. 7A, DQO1 denotes the waveform of the output data signal when the conventional pre-emphasis circuit 13 of FIG. 1 does not operate, and DQO2 denotes the waveform of the output data signal when the pre-emphasis circuit 13 operates.

In the waveform DQO1, the voltage swing of a portion of the output data signal being frequently toggled (labeled W1 in FIG. 7A), is remarkably lower than that of a portion of the output data signal, which is kept to be at a predetermined level (labeled by W2 in FIG. 7A). On the other hand, in the waveform DQO2 pre-emphasized by the pre-emphasis circuit 13, the voltage of a portion of the output data signal indicated by W1 is more equivalent to that of a portion indicated by W2.

Referring to FIG. 7B, Do1 denotes the waveform of an output data signal when the pre-emphasis circuit 120, 220, or 320 does not operate, and Do2 denotes the waveform of the output data signal when the pre-emphasis circuit 120, 220, or 320 operates. In the waveform Do1, the voltage of a portion of the output data signal being frequently toggled (labeled W3 in FIG. 7B) is remarkably lower than that of a portion kept to be at a predetermined level (labeled as W4 in FIG. 7B). On the other hand, in the waveform Do2 of the pre-emphasized output data signal, the voltage of a portion indicated by W3 is more equivalent to that of a portion indicated by W4.

As described above, all of the conventional pre-emphasis circuit 13 and the pre-emphasis circuit 120, 220, or 320 according to the present invention control the voltage of a portion of an output data signal, which is frequently toggled, to be more equivalent to the voltage of a portion of the output data signal, which is kept to be at a predetermined level. However, the conventional pre-emphasis circuit 13 controls only the voltage of the output data signal DQO output from the output driver 12 of FIG. 1 with high current consumption and increased pre-emphasis ratio. In contrast, the pre-emphasis circuits 120, 220, and 320 according to the present invention each adjust the voltage of a signal input to and/or output from the output drivers 130, 230, and 330, respectively. Accordingly, the pre-emphasis circuits 120, 220, and 320 have less current consumption and significantly reduced pre-emphasis ratio.

Figure 8:
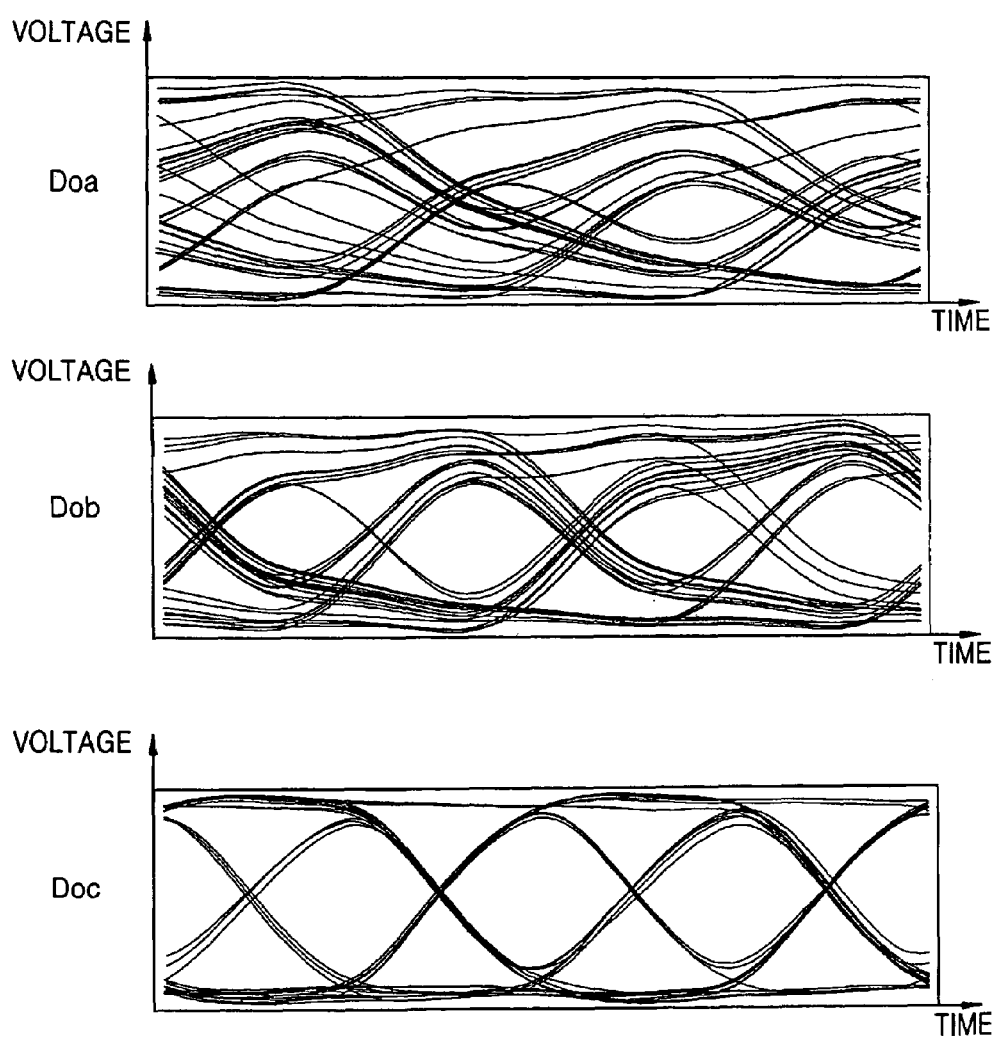
FIG. 8 illustrates the waveforms of an output data signal, changed according to whether an pre-emphasis operation of an output driver circuit is performed according to an embodiment of the present invention.

FIG. 8 illustrates the waveforms of an output data signal output from an output driver circuit, changed according to whether a pre-emphasis operation is performed according to an embodiment of the present invention. Referring to FIG. 8, Doa indicates the waveform of the output data signal when the pre-emphasis operation is not performed. Dob indicates the waveform of the output data signal when the pre-emphasis operation is performed on an output signal output from an output driver. Doc indicates the waveform of the output data signal when the pre-emphasis operation is performed on both an input signal and an output signal of the output driver.

In particular, the waveforms Dob and Doc are obtained when the pre-emphasis operation is performed at the same pre-emphasis ratio. As shown in FIG. 8, regions of the waveform Doc are greater than that of the waveforms Doa and Dob. The waveforms of FIG. 8 reveal that the waveform of the output data signal is the most preferable when the pre-emphasis operation is performed on all signals input to and output from the output driver.

In this manner, an output driver circuit according to the present invention has reduced current consumption and pre-emphasis ratio by controlling the voltages of signals input to and/or output from an output driver.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An output driver circuit comprising:
a control circuit for generating a control signal in response to a current internal data signal;
an output driver for generating an output data signal in response to the control signal; and
a pre-emphasis circuit for adjusting a current flowing through a node having the control signal generated thereon in response to a previous internal data signal, wherein the adjustment of the current increases the control signal by a predetermined voltage increment when logic levels of the current and previous internal data signals are different and when the control signal has a logic high level, and wherein the adjustment of the current decreases the control signal by the predetermined voltage increment when logic levels of the current and previous internal data signals are different and when the control signal has a logic low level.

2. The output driver circuit of claim 1, wherein the adjustment of the current decreases the control signal by the predetermined voltage increment when logic levels of the current and previous internal data signals are same and when the control signal has a logic high level, and wherein the adjustment of the current increases the control signal by the predetermined voltage increment when logic levels of the current and previous internal data signals are same and when the control signal has a logic low level.

3. The output driver circuit of claim 1, wherein the control circuit includes:
a multiplexer that serializes data bits of the current internal data signal according to a clock signal; and
a pre-driver that generates the control signal in response to the serialized data bits of the current internal data signal.

4. The output driver circuit of claim 1, wherein the pre-emphasis circuit includes:
a multiplexer that serializes data bits of the previous internal data signal according to a clock signal; and
a pre-driver that adjusts the current through the node having the control signal generated thereon in response to the serialized data bits of the previous internal data signal.

5. An output driver circuit comprising:
a control circuit for generating a control signal in response to a current internal data signal;
an output driver for generating an output data signal in response to the control signal, and
a pre-emphasis circuit for adjusting a current flowing through a node having the control signal generated thereon in response to a previous internal data signal, wherein the adjustment of the current decreases the control signal by the predetermined voltage increment when logic levels of the current and previous internal data signals are same and when the control signal has a logic high level, and wherein the adjustment of the current increases the control signal by the predetermined voltage increment when logic levels of the current and previous internal data signals are same and when the control signal has a logic low level.

6. The output driver circuit of claim 5, wherein the control circuit includes:
a multiplexer that serializes data bits of the current internal data signal according to a clock signal; and
a pre-driver that generates the control signal in response to the serialized data bits of the current internal data signal.

7. The output driver circuit of claim 6, wherein the pre-driver generates the control signal as differential signals.

8. The output driver circuit of claim 5, wherein the pre-emphasis circuit includes:
a multiplexer that serializes data bits of the previous internal data signal according to a clock signal; and
a pre-driver that adjusts the current through the node having the control signal generated thereon in response to the serialized data bits of the previous internal data signal.

9. The output driver circuit of claim 5, wherein the pre-emphasis circuit adjusts an output current flowing through an output node having the output signal generated thereon in response to the previous internal data signal.

10. The output driver circuit of claim 9, wherein the pre-emphasis circuit includes:
a multiplexer that serializes data bits of the previous internal data signal according to a clock signal;
a pre-driver that adjusts the current through the node having the control signal generated thereon in response to the serialized data bits of the previous internal data signal;
another pre-driver that generates another control signal in response to the serialized data bits of the previous internal data signal; and
a sub-output driver that adjusts the output current in response to the another control signal from the another pre-driver.

11. The output driver circuit of claim 10, wherein the pre-emphasis circuit further includes:
  a sub-emphasis circuit that adjusts a control current through a control node having the another control signal generated thereon in response to another previous internal data signal.

12. The output driver circuit of claim 11, wherein the sub-emphasis circuit includes:
  another multiplexer that serializes data bits of the another previous internal data signal according to another clock signal; and
  an additional pre-driver that adjusts the control current through the control node in response to the serialized data bits of the another previous internal data signal.

13. A method for driving a signal line comprising:
  generating a control signal in response to a current internal data signal;
  generating an output data signal in response to the control signal;
  adjusting a current flowing through a node having the control signal generated thereon in response to a previous internal data signal;
  adjusting the current to increase the control signal by a predetermined voltage increment when logic levels of the current and previous internal data signals are different and when the control signal has a logic high level; and
  adjusting the current to decrease the control signal by the predetermined voltage increment when logic levels of the current and previous internal data signals are different and when the control signal has a logic low level.

14. The method of claim 13, further comprising:
  adjusting the current to decrease the control signal by the predetermined voltage increment when logic levels of the current and previous internal data signals are same and when the control signal has a logic high level; and
  adjusting the current to increase the control signal by the predetermined voltage increment when logic levels of the current and previous internal data signals are same and when the control signal has a logic low level.

15. The method of claim 13, wherein the control signal is generated as differential signals.

16. The method of claim 13, further comprising:
  adjusting an output current flowing through an output node having the output signal generated thereon in response to the previous internal data signal.

17. The method of claim 16, further comprising:
  generating another control signal in response to the previous internal data signal; and
  adjusting the output current in response to the another control signal.

18. The method of claim 17, further comprising:
  adjusting a control current through a control node having the another control signal generated thereon in response to another previous internal data signal.

* * * * *